United States Patent
Trompeter

(10) Patent No.: US 9,061,421 B2
(45) Date of Patent: Jun. 23, 2015

(54) ROBOTIC WORK OBJECT CELL CALIBRATION METHOD

(76) Inventor: Matthew E. Trompeter, Macomb, MI (US)

(*) Notice: Subject to any disclaimer, the term of this patent is extended or adjusted under 35 U.S.C. 154(b) by 541 days.

(21) Appl. No.: 13/385,797

(22) Filed: Mar. 7, 2012

(65) Prior Publication Data

US 2012/0265341 A1  Oct. 18, 2012

Related U.S. Application Data

(60) Provisional application No. 61/465,080, filed on Mar. 14, 2011, provisional application No. 61/518,912, filed on May 13, 2011.

(51) Int. Cl.
*B25J 9/16*  (2006.01)

(52) U.S. Cl.
CPC ..... *B25J 9/1692* (2013.01); *G05B 2219/39033* (2013.01)

(58) Field of Classification Search
None
See application file for complete search history.

(56) References Cited

U.S. PATENT DOCUMENTS

| | | | |
|---|---|---|---|
| 4,753,569 A | 6/1988 | Pryor | |
| 5,910,719 A | 6/1999 | Thorne | |
| 6,044,308 A | 3/2000 | Huissoon | |
| 6,321,137 B1 | 11/2001 | de Smet | |
| 6,352,354 B1 | 3/2002 | Boillot | |
| 6,408,252 B1 | 6/2002 | de Smet | |
| 6,529,852 B2 | 3/2003 | Knoll et al. | |
| 7,359,817 B2* | 4/2008 | Ban et al. | 702/94 |
| 7,756,608 B2 | 7/2010 | Brogardh | |
| 7,945,349 B2 | 5/2011 | Svensson et al. | |
| 7,979,159 B2 | 7/2011 | Fixell | |
| 8,180,487 B1 | 5/2012 | Vangal-Ramamurthy et al. | |
| 2003/0159299 A1 | 8/2003 | Goodrich | |
| 2004/0267405 A1 | 12/2004 | Ingenhoven et al. | |
| 2007/0141963 A1 | 6/2007 | Mortell et al. | |
| 2008/0234863 A1 | 9/2008 | Pagel et al. | |
| 2009/0157226 A1* | 6/2009 | de Smet | 700/254 |
| 2009/0240372 A1 | 9/2009 | Bordyn et al. | |
| 2011/0129792 A1 | 6/2011 | Berckmans et al. | |
| 2012/0265341 A1* | 10/2012 | Trompeter | 700/254 |
| 2012/0283874 A1* | 11/2012 | Trompeter | 700/254 |
| 2013/0268226 A1 | 10/2013 | Mortino | |

FOREIGN PATENT DOCUMENTS

| | | |
|---|---|---|
| JP | 2005059103 | 3/2005 |
| JP | 2008112294 | 5/2008 |

* cited by examiner

*Primary Examiner* — Robert R Raevis
(74) *Attorney, Agent, or Firm* — Gerald R. Black, Esq.

(57) ABSTRACT

The robotic work object cell calibration method includes a work object or emitter. Initially, placing the work object is placed in a selected position on a fixture or work piece on the shop floor. The work object emits a pair of beam-projecting lasers which intersect at a tool contact point and act as a crosshair. The robot tool is manipulated into the tool contact point. The work object emits four plane-projecting lasers which are used to adjust the roll, yaw, and pitch of the robot tool relative to the tool contact point. The robotic work object cell calibration method of the present invention increases the accuracy of the off-line programming and decreases robot teaching time.

12 Claims, 13 Drawing Sheets

ROBOT without WORK OBJECT
(PRIOR ART)

ROBOT with WORK OBJECT

ROBOT with WORK OBJECT

ROBOTIC WORK OBJECT CELL CALIBRATION METHOD

This application is related to and claims priority to U.S. Provisional Application No. 61/465,080, entitled "Robotic Work Object Cell Calibration System and Method," filed on Mar. 14, 2011; to U.S. Provisional Application No. 61/518,912, entitled "Robotic Work Object Cell Calibration System and Method," filed on May 13, 2011; and to U.S. patent application Ser. No. 13/385,091 "Robotic Work Object Cell Calibration System," filed on Feb. 1, 2012. The disclosures of these Applications are hereby incorporated by reference into this specification in their entireties.

FIELD OF USE

The present invention relates to a calibration device and method for an industrial robot and, more particularly, to a calibration method for the industrial robot provided with an imaging device of a visual sensor for detecting a working tool and a working position.

BACKGROUND OF THE INVENTION

The sales of industrial robots that has been driven by the automotive industry, is now moving into tasks as diverse as cleaning sewers, detecting bombs, and performing intricate surgery. The number of units sold increased to 120,000 units in 2010, twice the number as the previous year, with automotive, metal and electronics industries driving the growth.

Prior approaches to calibrating robots use measuring devices that measure either the inaccuracies of the robot after the robot is built or devices which measure work piece positions relative to the robot position prior to off-line programs. Prior art systems involve expensive equipment and specialized users and take longer.

U.S. Patent Application Disclosure No. 20090157226 (de Smet) discloses a robot-cell calibration system for a robot and it's peripheral. The system includes an emitter attached to the robot or its' peripheral and emits a laser beam and a receiver also mounted to the robot or its peripheral at a point to permit calibration and for receiving the laser beam and to permit calculations to determine the dimension between the emitter and the receiver.

U.S. Pat. No. 6,408,252 (de Smet) discloses a calibration system and displacement measurement device for calibrating a robot system. The system comprises a linear displacement measurement device in conjunction with a robot calibration system. The linear displacement measurement device comprises an elongated member, a drum, a shaft, a drum displacement mechanism and a drum rotation sensor. The drum is displaced axially upon the shaft as the drum rotates when the elongated member is moved. The drum rotation sensor provides accurate information regarding the distance the elongated member travels. The displacement measuring device is used in an iterative manner with the calibration system for the purpose of the calibration of a robotic device.

U.S. Pat. No. 6,321,137 (de Smet) discloses a method for calibration of a robot inspection system. The system is used for inspecting a work piece to maintain the accuracy of the robot during inspection of work pieces on a production basis. The system includes means for storing a mathematical model of the robot, means for measuring the position of a target, and then calibrating the robot based upon input from the mathematical model and the position of the target.

U.S. Pat. No. 6,044,308 (Huissoon) discloses a method for calibration of pose of a tool contact point (TCP) of a robot controlled tool with respect to a tool sensor means in which the robot controlled tool is attached at an end-point of the robot. A TCP sensor is located in a preselected second pose with respect to the reference fixture for sensing position of the tool contact point. The method includes positioning the tool sensor so that the reference fixture is in a field of view of the tool sensor and calculating a pose of the robot end point with respect to the robot frame of reference, calculating a pose of the reference fixture with respect to the tool sensor means from a sensed position of the four topographically defined features of the reference fixture, and calculating a position of the tool contact point with respect to the reference fixture from a sensed position of the tool contact point with respect to the TCP sensor means.

The primary object of the robotic work object cell calibration method of the present invention is to increase the accuracy of the off-line program and decrease robot teaching time. Still another object of the robotic work object cell calibration method of the present invention is to provide a calibration method which is simpler, results in improved precision, involves a lower investment cost, and which entails lower operating costs than the prior art.

What is needed is a robotic work object cell calibration method for using different robot tools on a shop floor without having to perform a recalibration for each tool. What is needed is a robotic work object cell calibration method that requires no additional computers or software to determine the accuracy of the robot tool or location of peripheral equipment, which uses existing body-in-white procedures, personnel computers and software and ways of communicating information amongst the trades, and requires little or no retraining to deploy.

SUMMARY OF THE INVENTION

The robotic work object cell calibration method of the present invention addresses these objectives and these needs.

In the first preferred embodiment of the present invention, the robotic work object cell calibration method includes a work object or emitter. Initially, the work object is placed in a selected position on a fixture or work piece on the shop floor proximate to the robot.

The work object emits a pair of beam-projecting lasers from an E-shaped extension extending from a central frame. The beam-projecting lasers serve as a crosshair, intersecting at a tool contact point. The work object includes a horizontal frame member that includes a pair of opposing frame ends, and a vertical frame member that includes a pair of opposing frame ends. A plane-projecting laser is preferably disposed at each frame end, respectively, and a projected laser plane is emitted from each of the plane-projecting lasers, respectively. The plane-projecting lasers are used to adjust the roll, yaw, and pitch of the robot tool positioned at the tool contact point on the shop floor.

Method for calibrating a robot using the work object:
First, attach the emitter to the fixture. Using the calibration control unit of the robot, or a laptop computer with a control interface, the tool contact point is aligned to the horizontal beam-projecting lasers emitted from the work object.
Using the horizontal and vertical plane-projecting lasers, align the robot tool for roll, yaw, and pitch. Once this is done, note the coordinates and set this position as the zero position in the robot control unit, or in the control panel on the laptop being used to control the robot. This sets the point which the robot will use for its' work path. After the point has been set, the robot work path is ready to be used.

Now, test the calibration. If the robot does not impact the work object in any way and completes the intended operations, the calibration is done. If not, repeat the above until the work path is properly set.

A second and third preferred embodiments of the work object for use in the robotic work object calibration method of the present invention, comprises only two plane-projecting lasers attached to either the horizontal frame ends or the vertical frame ends. If only two plane-projecting lasers are used, adjustment is limited to either roll and yaw, roll and pitch, or yaw and pitch of the robot tool using said pair of plane-projecting lasers of said work object.

A fourth preferred embodiment of the work object of the present invention comprises only one plane-projecting laser attached to the middle of the work object. The laser head is capable of 360 degrees of rotation, enabling the robot tool to align first on the x-axis, then on the y-axis after the laser head has been rotated.

The robotic work object cell calibration system includes a work object. The work object emits a pair of beam-projecting lasers from an E-shaped extension extending from a central frame. The beam-projecting lasers serve as a crosshair, intersecting at a tool contact point. The work object includes a horizontal frame member that includes a pair of opposing frame ends, and a vertical frame member that includes a pair of opposing frame ends. A plane-projecting laser is preferably disposed at each frame end, respectively, and a projected laser plane is emitted from each of the plane-projecting lasers, respectively. The plane-projecting lasers are used to adjust the roll, yaw, and pitch of the robot tool relative to the tool contact point.

For a complete understanding of the robotic work object cell calibration method of the present invention, reference is made to the following summary of the invention detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention.

DETAILED DESCRIPTION OF THE PREFERRED EMBODIMENTS

Figure 1:
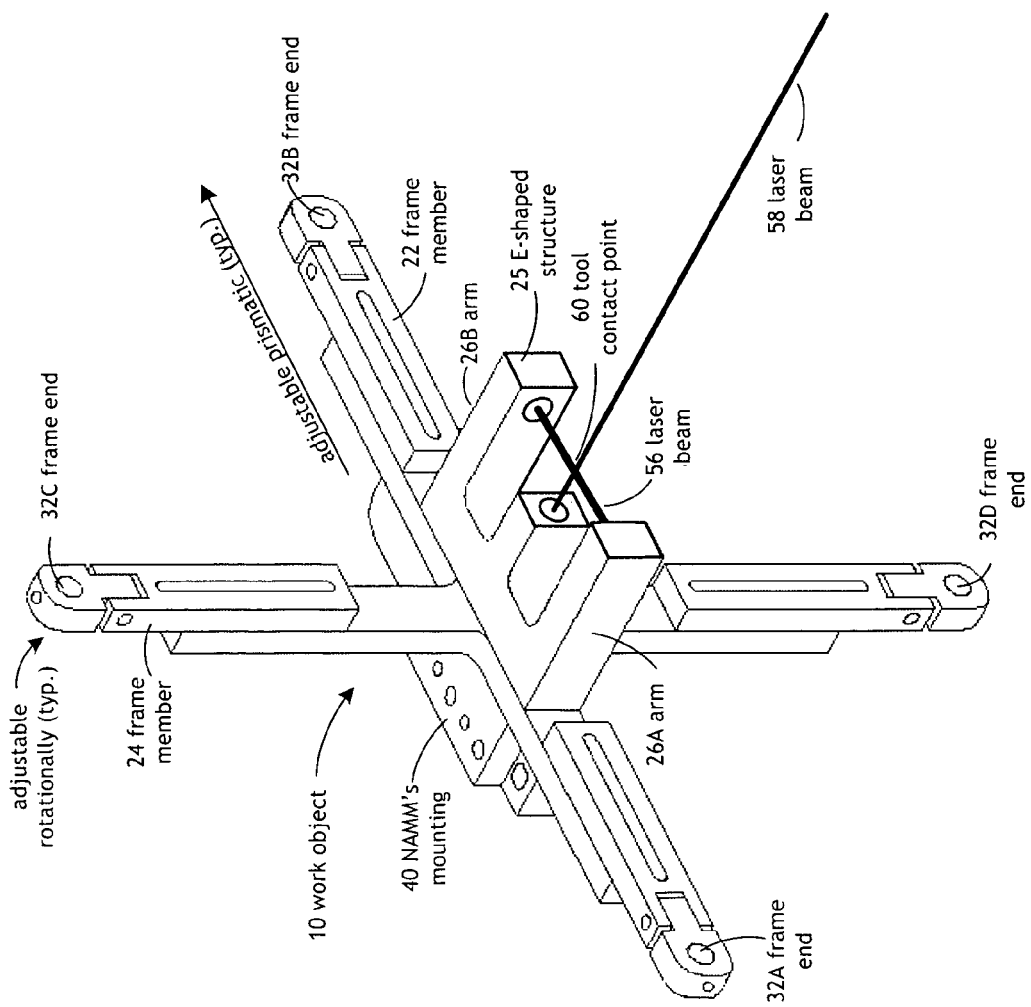
FIG. 1 depicts the first preferred embodiment of the work object for use in the robotic work object calibration method of the present invention, the two beam-projecting lasers being used for aligning the tool contact point with the work object.
Figure 2:
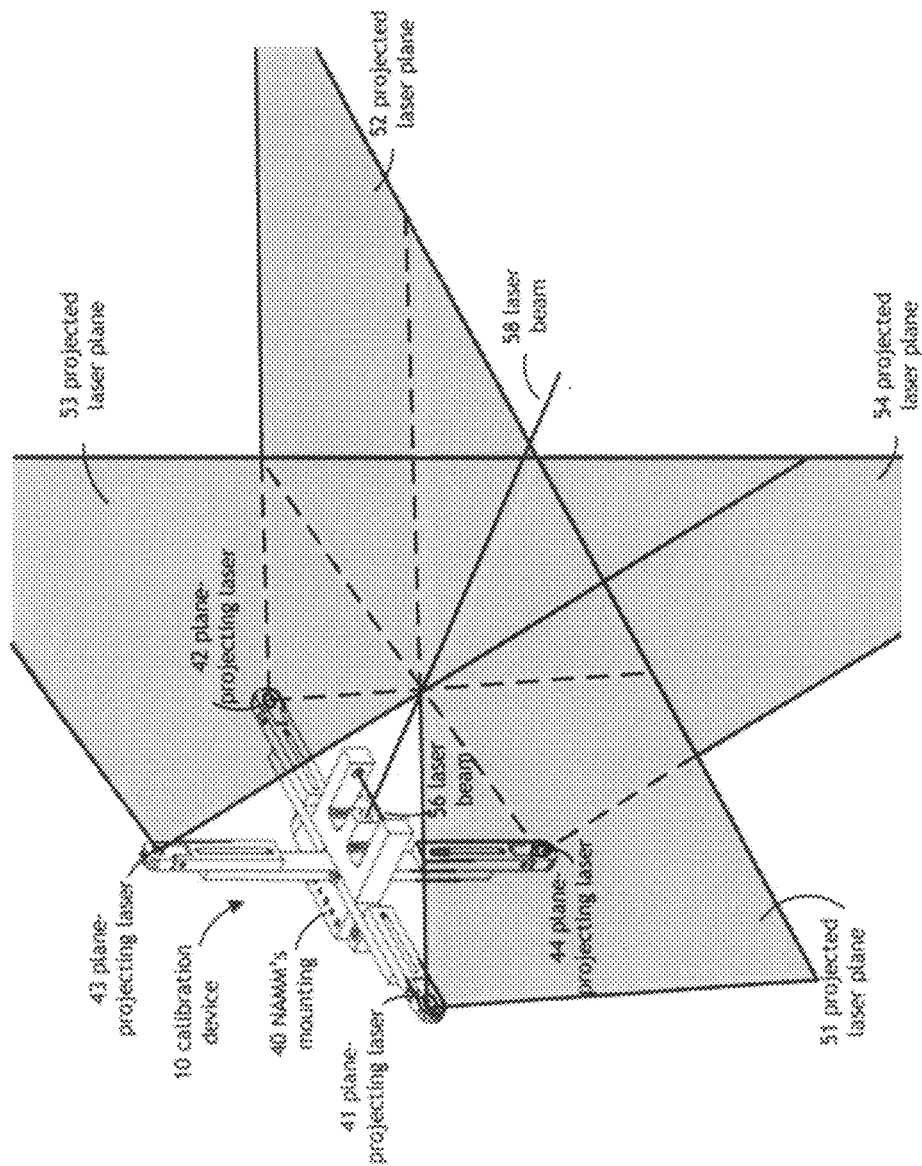
FIG. 2 depicts the first preferred embodiment of the work object for use in the robotic work object calibration method of FIG. 1, the four plane-projecting lasers being emitted from the work object.

Referring now to the drawings, FIGS. 1 and 2 disclose a first preferred embodiment of a work object or emitter [10] for use in the robotic work object calibration method of the present invention. The work object [10] is used to calibrate the work path of a robot tool based on a tool contact point (point in space) [60]. The known point in space [60] is defined in three dimensions (X, Y, and Z) and relative to their rotational axes $R_x$ (pitch), $R_y$ (yaw), and $R_z$ (roll).

The work object [10] includes a horizontal frame member [22] that includes a pair of opposing frame ends [32A and 32B], and a vertical frame member [24] that includes a pair of opposing frame ends [32C and 32D]. A plane-projecting laser [41, 42, 43, and 44] is preferably disposed at each frame end [32A, 32B, 32C, and 32D], respectively, and a projected laser plane [51, 52, 53, and 54] is emitted from each of the plane-projecting lasers [41, 42, 43, and 44], respectively.

Extending along the horizontal frame member [22] are three arms parallel which combine to form the general shape of the letter "E" of an E-shaped structure [25] which is horizontally aligned and generally centrally disposed relative to horizontal frame member [22]. The center arm (not numbered) of the E-shaped structure [25] is shorter than the two end arms [26A and 26B].

A first beam-projecting laser [58] is emitted from the center arm of the "E" disposed at the proximate center of the work object [10]. A second beam-projecting laser [56] is emitted from one of the arms [26A] of an E-shaped structure [25] and is directed into the opposing arm [26B].

The first beam-projecting laser [58] intersects and is essentially perpendicular and coplanar with the second beam-projecting laser [56] at a known point in space [60], defined in three dimensions in terms of X, Y, and Z coordinates.

The first beam-projecting laser [58] is essentially coplanar with the two projected laser planes [51 and 52] emitted from the plane-projecting lasers [41 and 42] emitted from frame ends [32A and 32B]. Also, the first beam-projecting laser [58] is essentially coplanar with the two projected laser planes [53 and 54] emitted from the plane-projecting lasers [43 and 44] emitted from frame ends [32C and 32D]. The work object [10] is mountable onto a fixture [90] and enables a robot work path to be calibrated relative to the known point in space [60].

The plane-projecting lasers [41, 42, 43, and 44] project the four projected laser planes [51, 52, 53, and 54, respectively] from the frame ends [32A, 32B, 32C, and 32D, respectively] of the work object [10]. The plane-projecting lasers [41, 42, 43, and 44] are red laser modules, having focused lines (3.5 v~4.5 v 16 mm 5 mw).

The beam-projecting lasers [56 and 58] are focusable points that project the two laser beams emitted from the arm [26A] of the work object [10]. The beam-projecting lasers [56 and 58] are red laser modules, having focusable dots (3.5 v~4.5 v 16 mm 5 mw).

Figure 3:
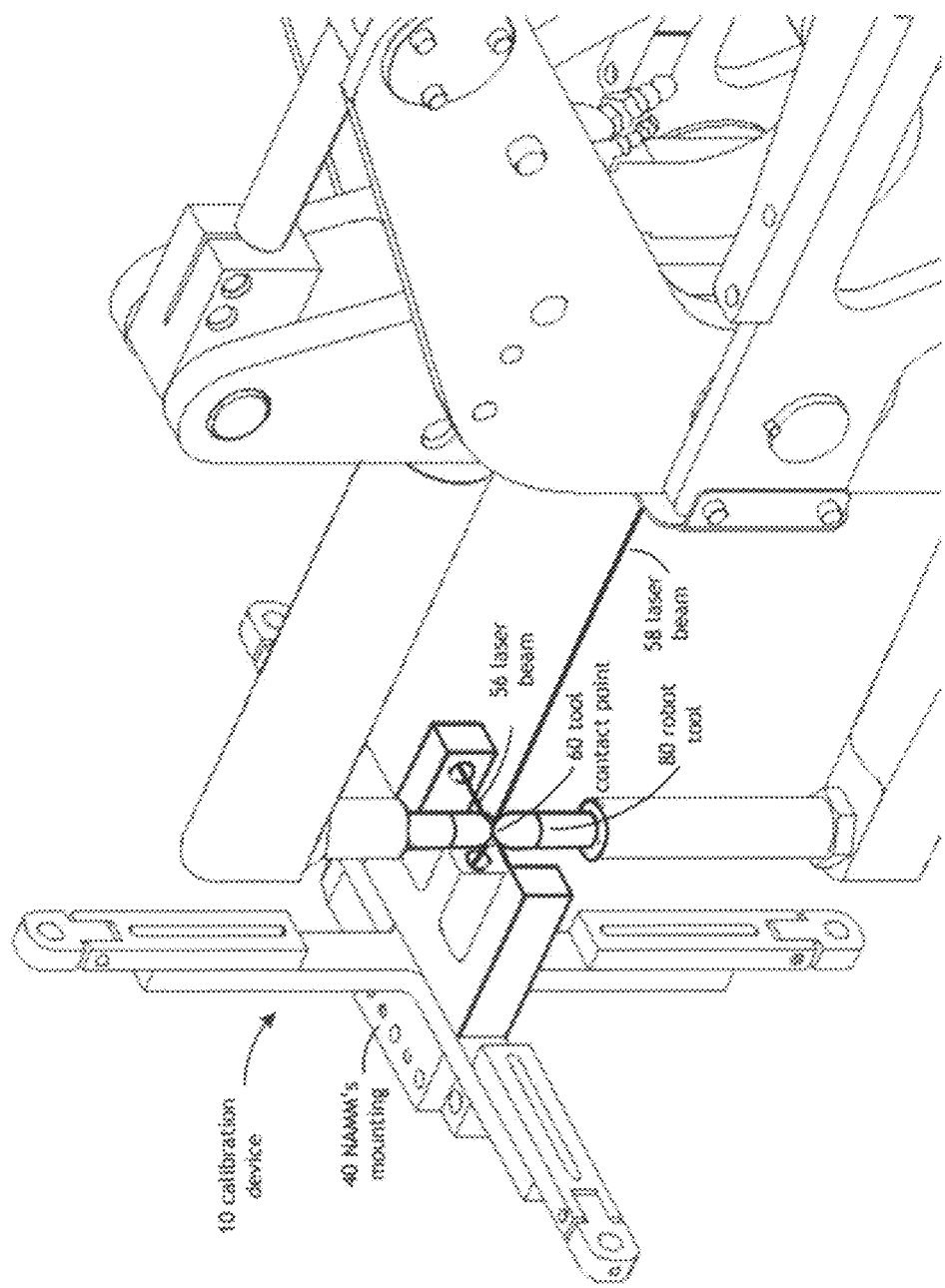
FIG. 3 depicts an exploded view of the first preferred embodiment of the work object for use in the robotic work object calibration method of FIG. 1, further depicting the weld gun with the tool contact point of the weld gun aligned to the horizontal and vertical alignment lasers.
Figure 4:
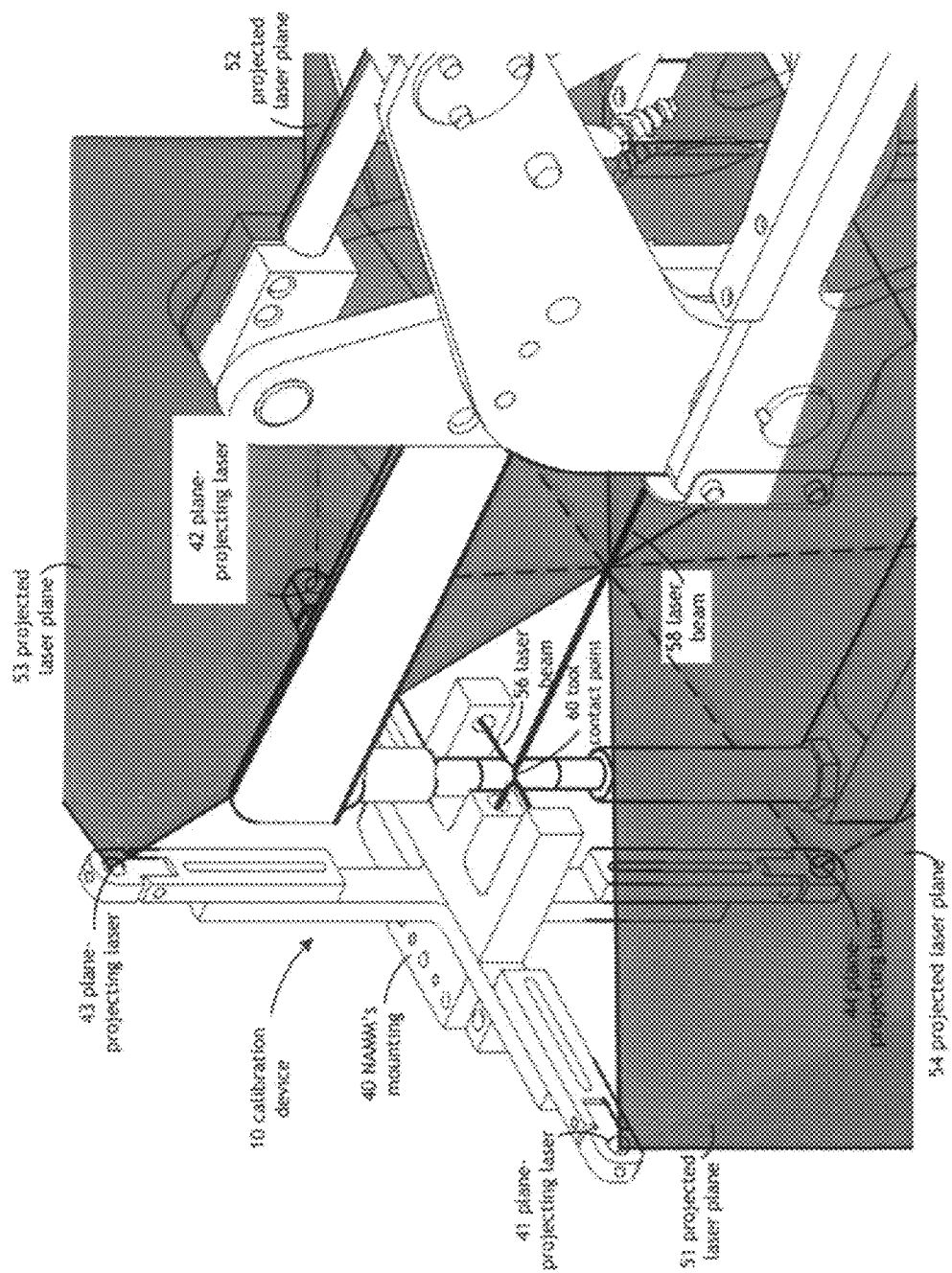
FIG. 4 depicts the exploded view of the first preferred embodiment of the work object for use in the robotic work object calibration method of FIG. 3, further depicting the addition of two pairs of plane-projecting lasers for adjusting the roll, yaw, and pitch of the tool head of the weld gun.

FIG. 3 depicts an exploded view of the work object [10] for use with a weld gun. The tool contact point [60] of the weld gun is aligned with the two beam-projecting alignment lasers [56 and 58]. FIG. 4 further depicts the addition of the four projected laser planes [51, 52, 53, and 54, respectively] from the plane-projecting lasers [41, 42, 43, and 44, respectively] for adjusting the roll, yaw, and pitch of the robot tool head [80].

Figure 5:
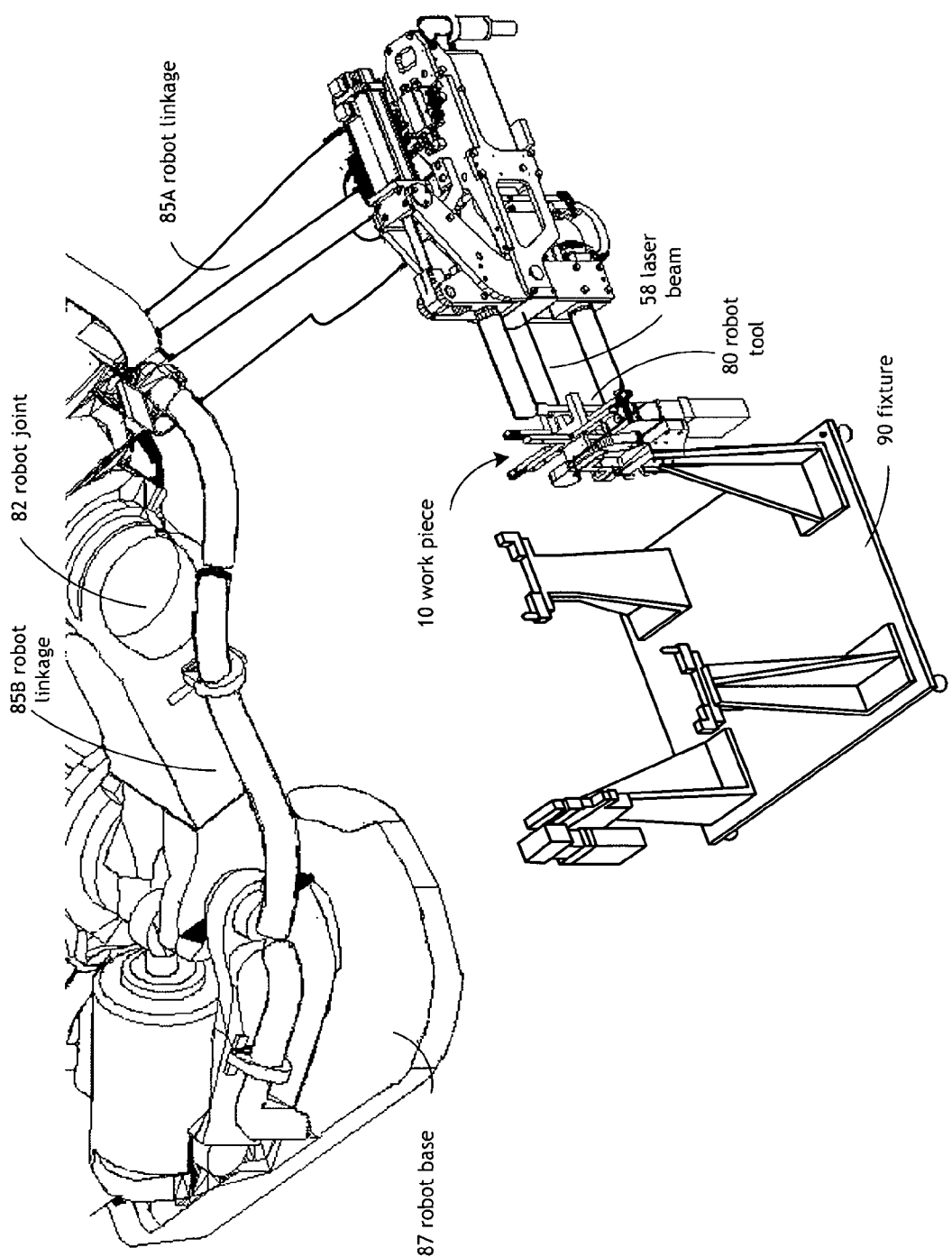
FIG. 5 depicts an assembly view of the first preferred embodiment of the work object for use in the robotic work object calibration method of FIG. 1, further depicting the work object being mounted onto a fixture with the robot tool head aligned to the two beam-projecting lasers using the tool contact point.
Figure 6:
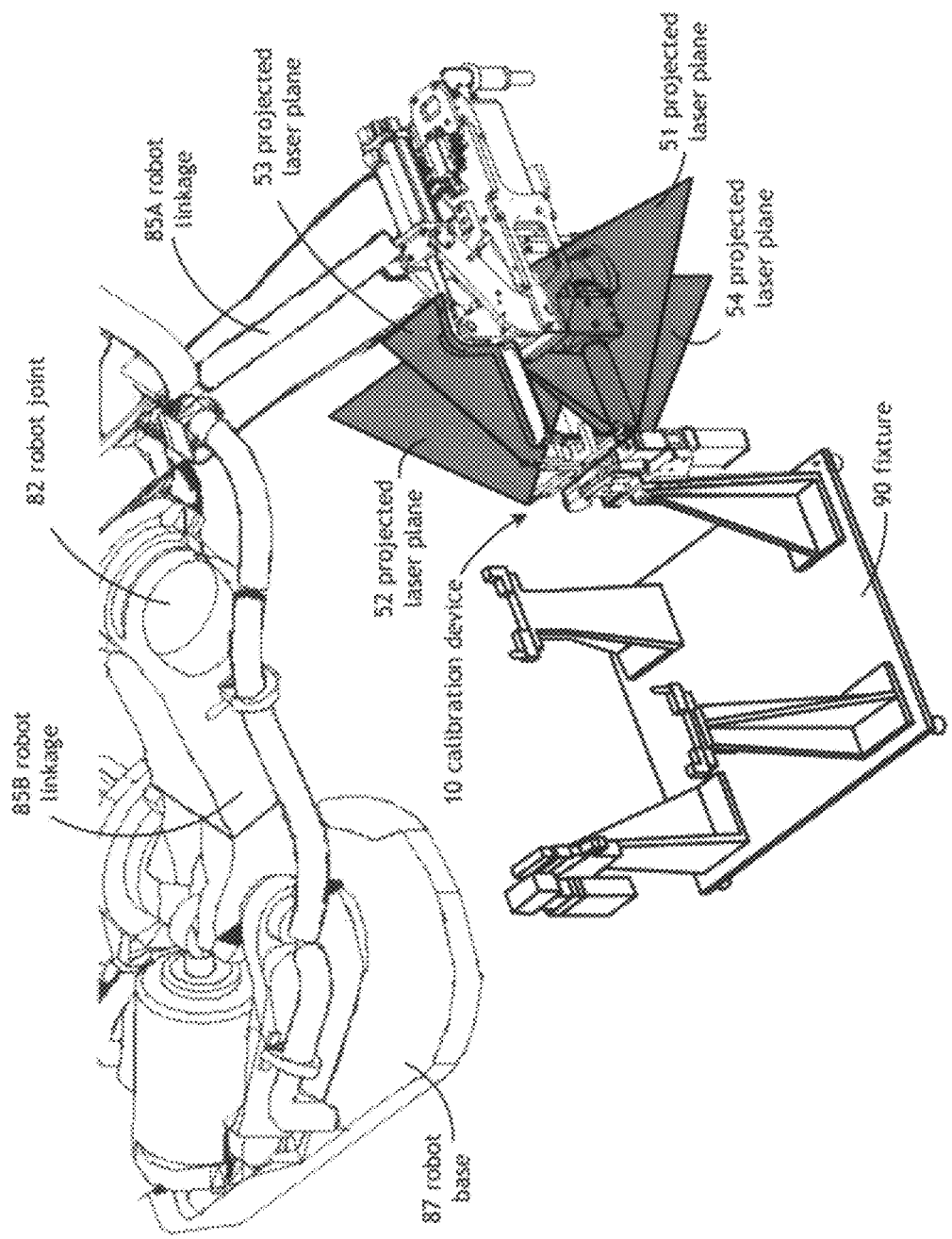
FIG. 6 depicts the assembly view of the work object for use in the robotic work object calibration method of FIG. 5, further depicting the four plane-projecting lasers being used for adjusting the roll, yaw, and pitch of the tool head of the robot.

FIG. 5 depicts the work object [10] being mounted onto the fixture [90]. The robot tool head [80] is aligned to the two beam-projecting lasers [56 and 58] using the tool contact point [60]. FIG. 6 further depicts the four projected laser planes [51, 52, 53, and 54, respectively] from the plane-projecting lasers [41, 42, 43, and 44, respectively] of work piece [10], which are used to adjust the roll, yaw, and pitch of the robot tool head [80].

Figure 7:
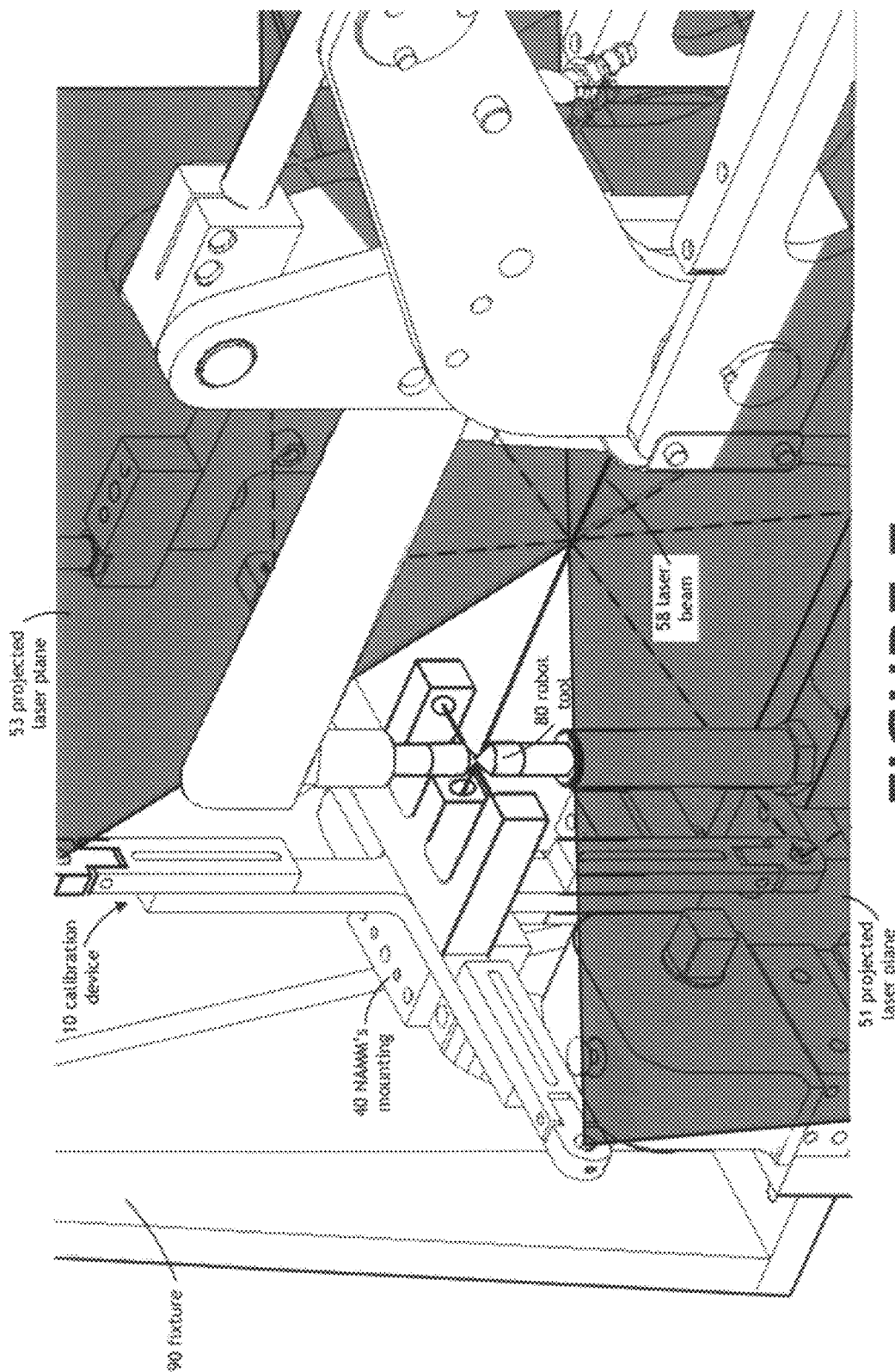
FIG. 7 depicts another exploded view of the first preferred embodiment of the work object for use in the robotic work object calibration method of FIG. 6, further depicting the work object being mounted to the fixture with the robot tool aligned to the tool contact point alignment lasers and the roll, yaw, and pitch alignment lasers.

FIG. 7 depicts the work object [10] mounted onto the fixture [90] with the robot tool [80] aligned with the tool contact point [60] alignment laser beams [56 and 58] setting the X, Y, and Z coordinates.

Figure 8:
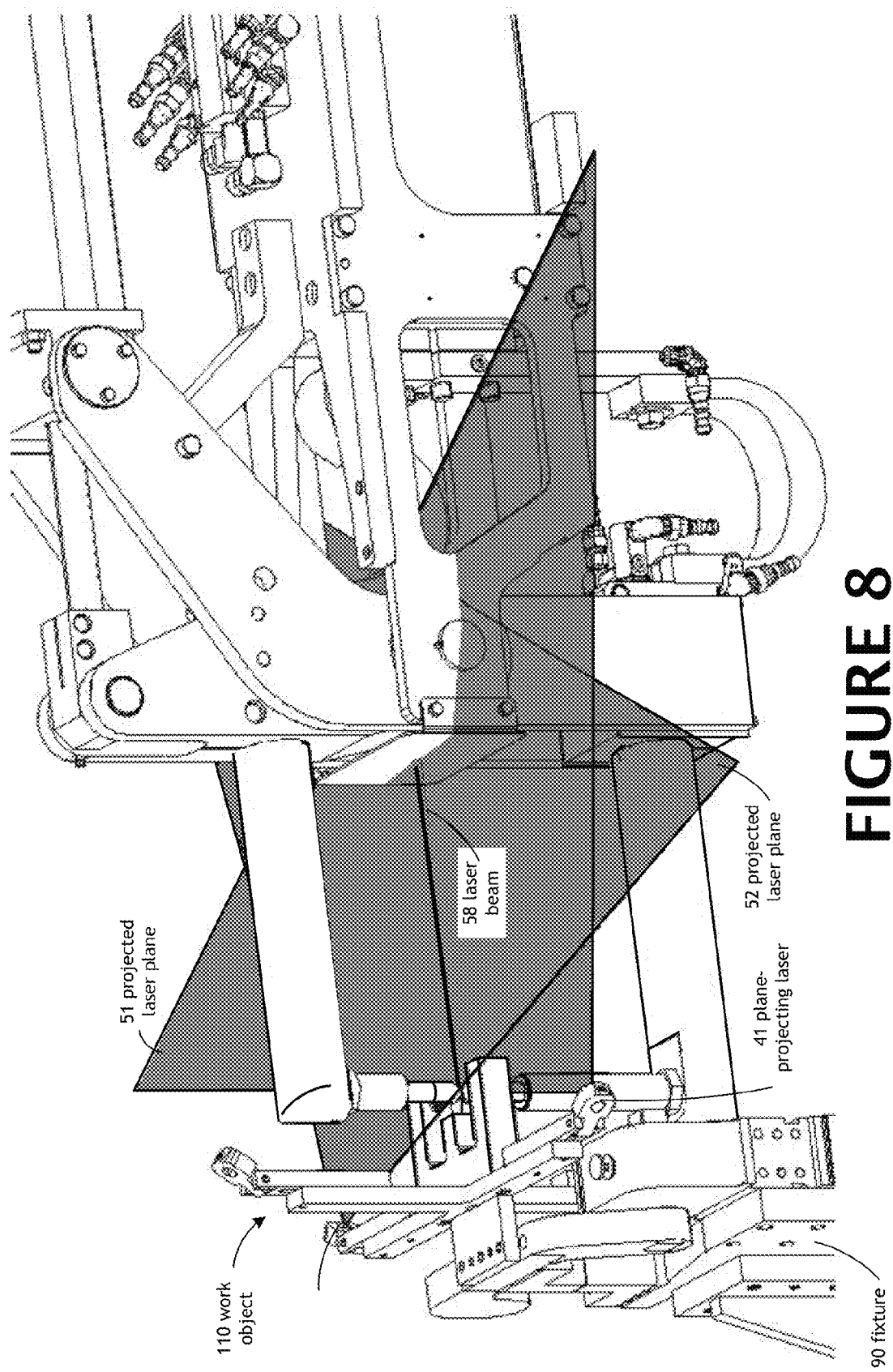
FIG. 8 depicts an assembly view of a second preferred embodiment of the work object of the work object for use in the robotic work object calibration method of the present invention, two plane-projecting lasers being emitted along the horizontal axis of the work object, a pair of beam-projecting lasers intersecting at a tool contact point, the robot tool being aligned to the tool contact point and to this pair of plane-projecting lasers.

FIG. 8 depicts a second preferred embodiment of a work object [110] for use in the robotic work object calibration method of the present invention. In this embodiment, two projected laser planes [51 and 52] are emitted from two plane-projecting lasers [41 and 42, respectively] along the horizontal axis of the frame member [32] of the work object [110]. The robot tool [80] is aligned with the tool contact point [60] and with this pair of projected laser planes [51 and 52].

Figure 9:
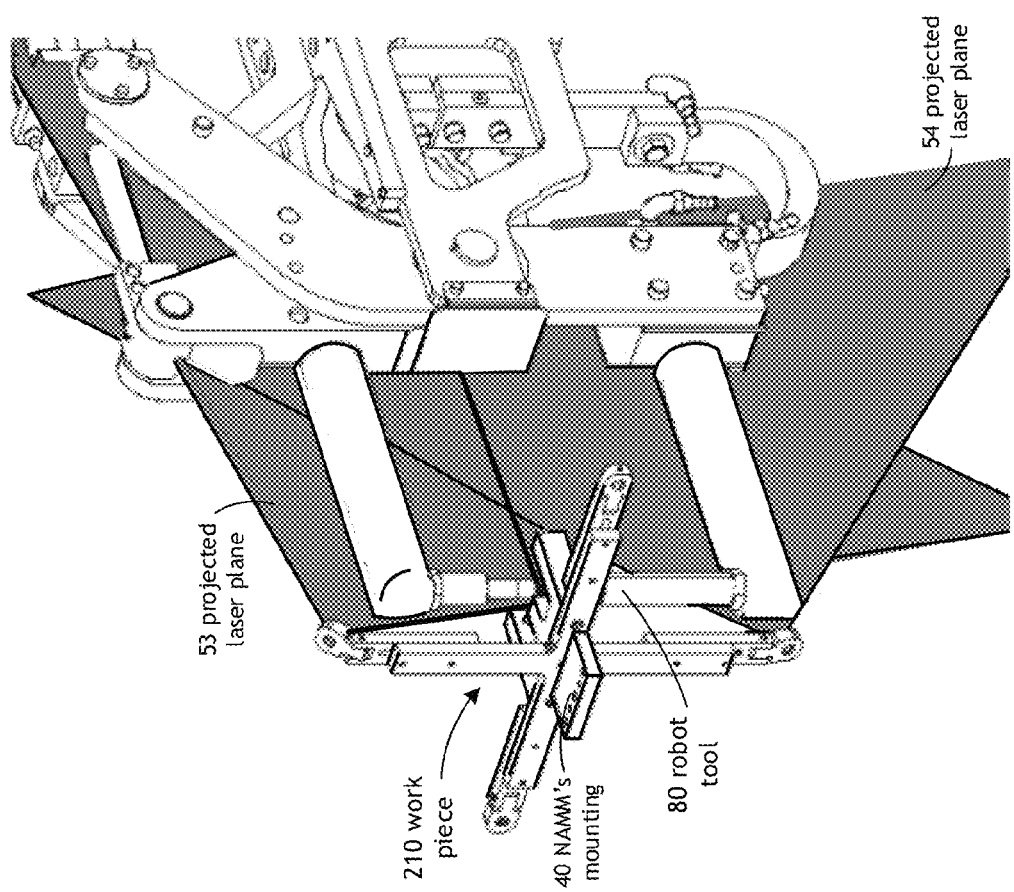
FIG. 9 depicts an assembly view of a third preferred embodiment of the work object of the work object for use in the robotic work object calibration method of the present invention, two plane-projecting lasers being emitted along the vertical axis of the work object, a pair of beam-projecting lasers intersecting at a tool contact point, the robot tool being aligned to the tool contact point and to this pair of plane-projecting lasers.

FIG. 9 depicts a third preferred embodiment of the work object [210] for use in the robotic work object calibration method of the present invention. In this embodiment, two projected laser planes [53 and 54] are emitted from two plane-projecting lasers [43 and 44] are emitted along the vertical axis of the frame member [24] of the work object [210]. The robot tool [80] is aligned with the tool contact point [60] and with this pair of projected laser planes [53 and 54].

Figure 10:
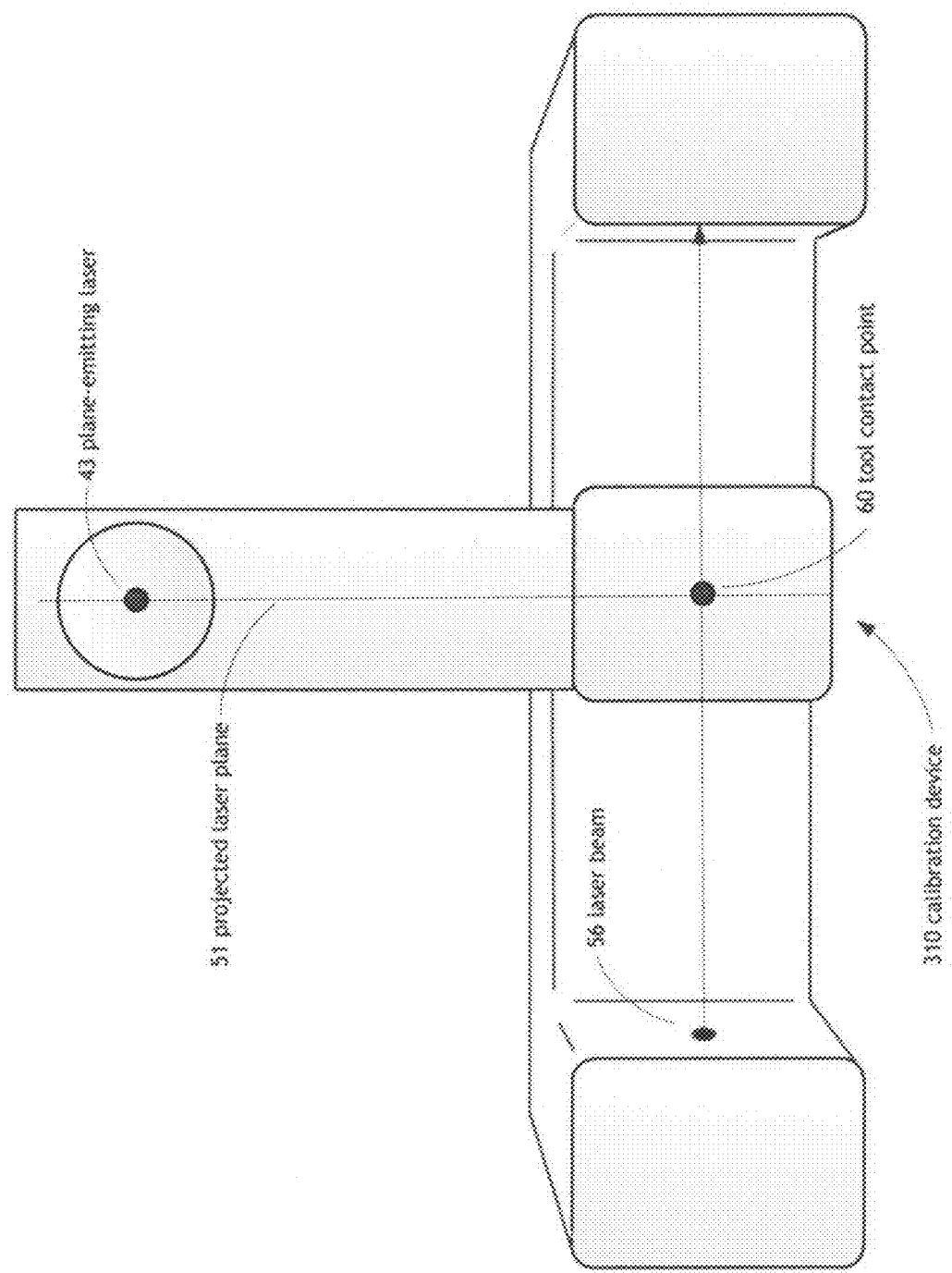
FIG. 10 depicts a fourth preferred embodiment of the work object of the work object for use in the robotic work object calibration method of the present invention, one plane-projecting laser being emitted along the vertical axis of the work object, and a beam-projecting laser intersecting one of the vertical plane-projecting lasers at a tool contact point.

FIG. 10 depicts yet another preferred embodiment of the work object [310] for use in the robotic work object calibration method of the present invention. In this embodiment, one plane projected laser [51] is emitted from plane-projecting laser along the vertical axis of the work object [310]. A beam-projecting laser [56] intersects with the vertical plane-projecting laser [53] at a tool contact point [60]. The plane-projecting laser [51] has a rotating head capable of rotating 360°, enabling the robot tool to align first on the x-axis, then on the y-axis after the laser head has been rotated.

Figure 11A:
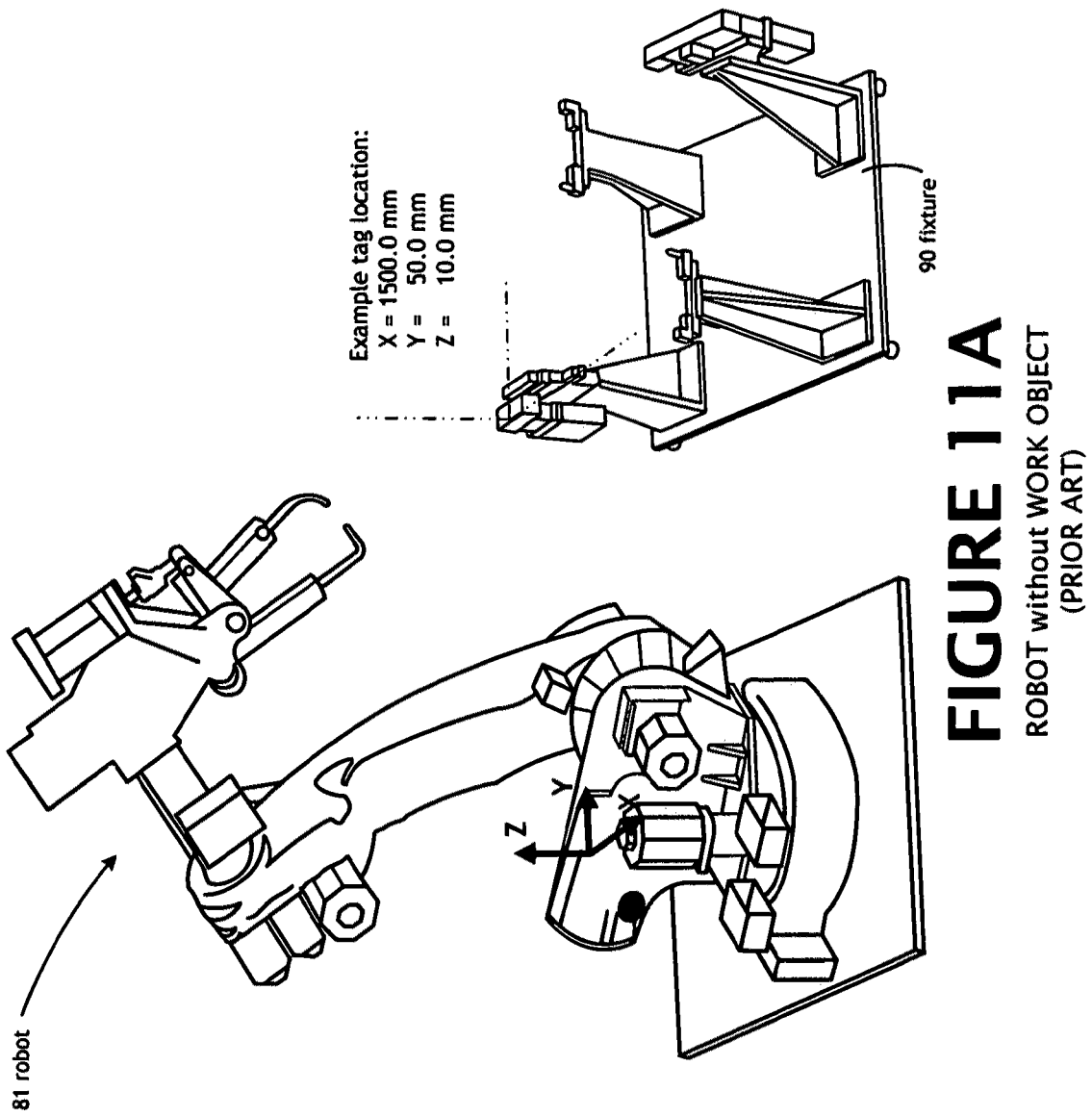
FIG. 11A depicts a robot and a fixture for use on a shop floor in a prior art embodiment without the work object of FIG. 1, and FIGS. 11B and 11C depict a similar robot, fixture with the work object used in the present invention, showing how in a simplified manner the work object is used to obtain a new zero location and calibrate the path between the fixture and the robot.
Figure 11B:
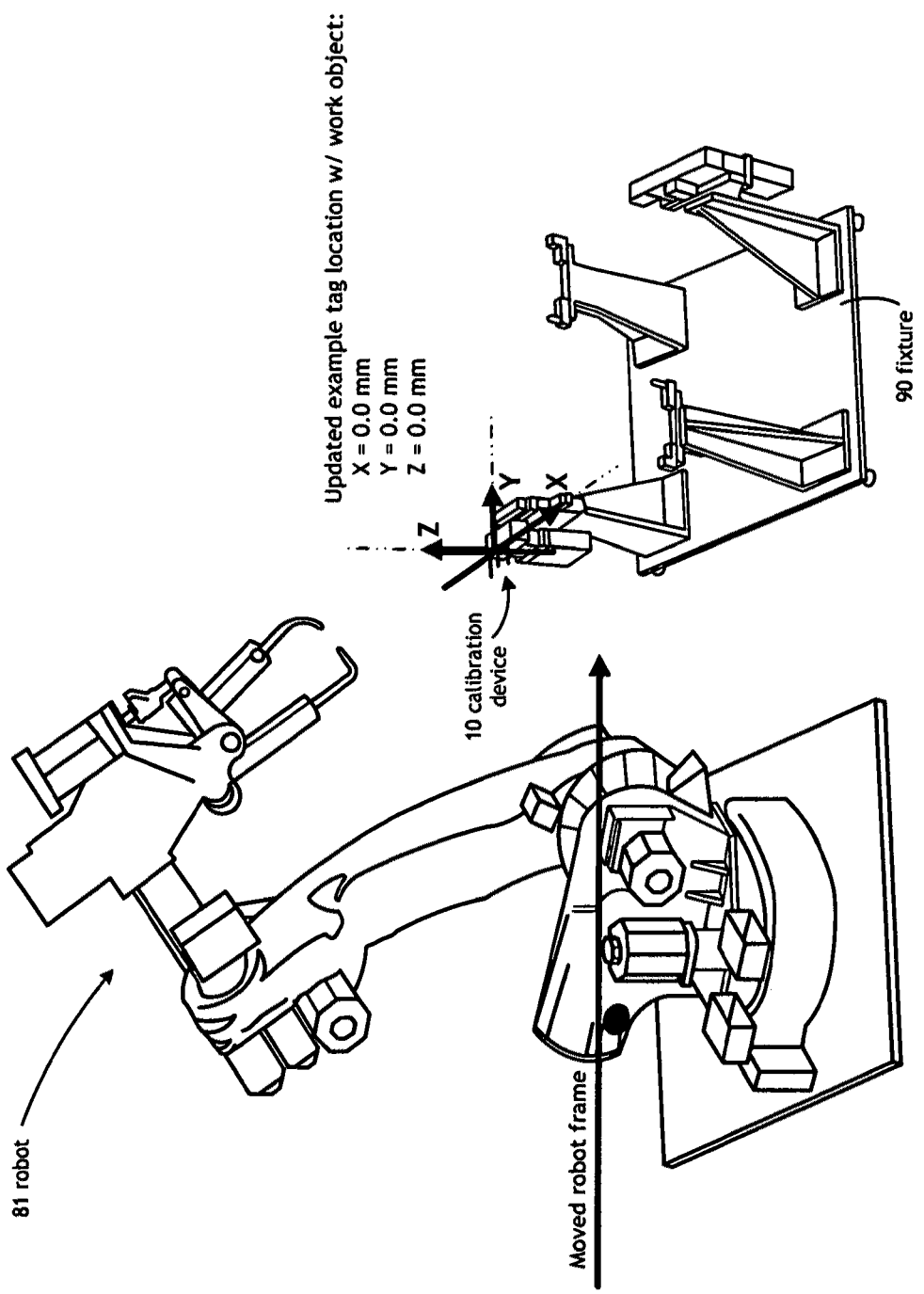
Figure 11C:
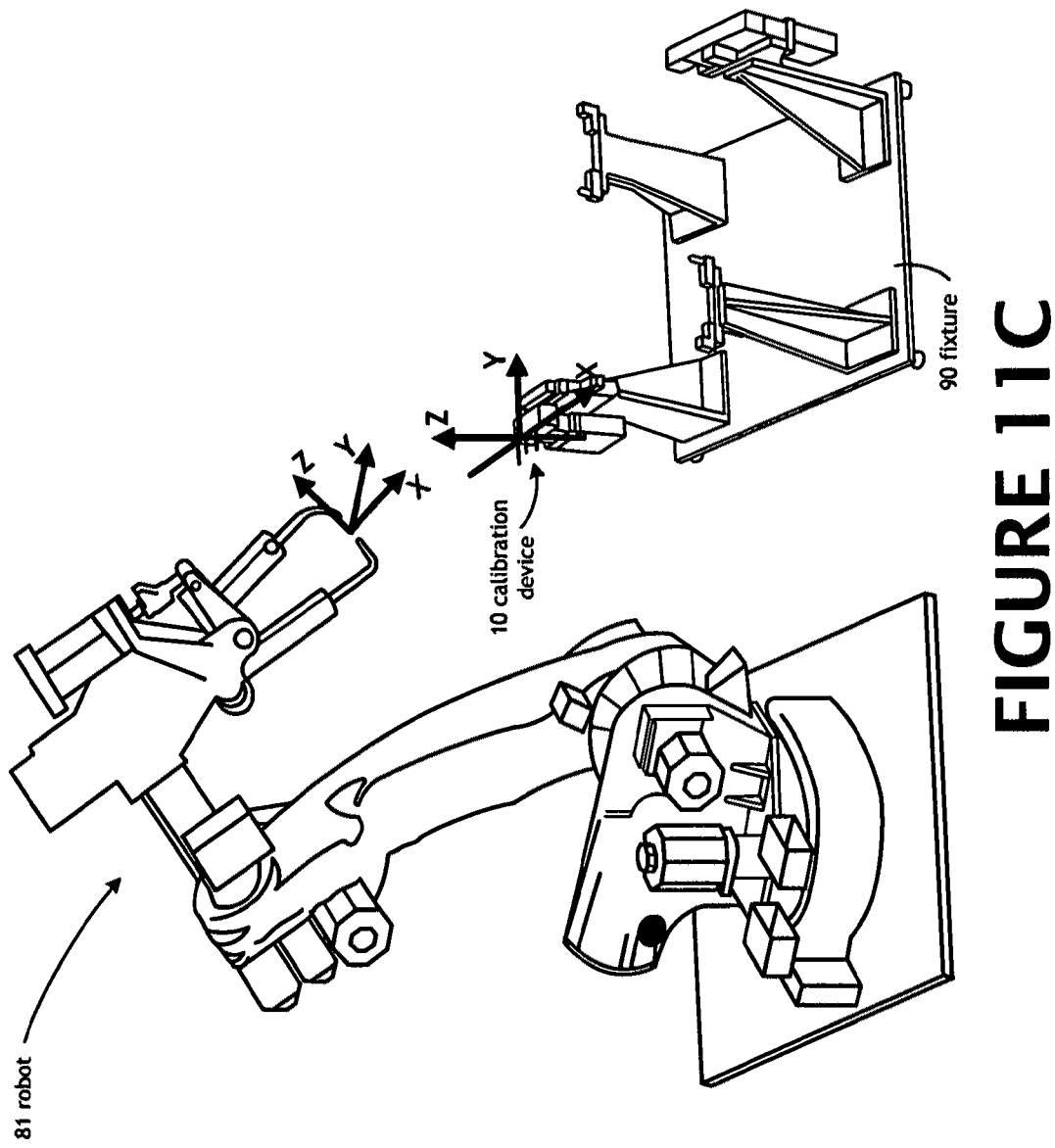

FIG. 11A depicts a robot [81] and a fixture [90] for use on a shop floor in a prior art embodiment without the work object of the present invention. FIGS. 11B and 11C depict a similar robot [81], and fixture [90] with the work object [10], depicting how in a simplified manner the work object [10] is used to obtain a new zero location and calibrate the path between the fixture [90] and the robot [81].

Using CAD simulation software, the CAD user selects a position on the tool to place that is best suited to avoid crashes with other tooling and for ease of access for the robot [81] or end-of-arm tooling. The offline programs are then downloaded relative to the work object [10]. The work object [10] is then placed onto the tool or work piece in the position that is defined by the CAD user on the shop floor. The robot technician then manipulates the tool contact point [60] of the robot tool [80] into the device and aligns it to the beam-projecting lasers [56 and 58] to obtain the difference between the CAD world and shop floor. This difference is then entered into the robot [81] and used to define the new work object [10]. This calibrates the offline programs and defines the distance and orientation of the tool, fixture, and peripheral.

The offline programming with the work object [10] on the fixture [90] enable the work object [10] to be touched up to the "real world position" of the fixture [90] relative to the robot [81]. If the fixture [90] ever needs to be moved or is accidently bumped, simply touch up the work object [10] and the entire path shifts to accommodate.

The robotic work cell calibrations method of the present invention is compatible with robotic simulation packages, including but not limited to, ROBCAD, Process Simulate, DELMIA, Roboguide and RobotStudio CAD software.

The beam-projecting lasers [56 and 58] and the projected laser planes [51, 52, 53, and 54] are projected onto known features of the robot tool [80], and then used to calibrate the path of the robot tool [80] and measure the relationship of the fixture [90] relative to the robot tool [80].

The CAD user initially selects a position best suited on a tool or work piece to avoid crashes with other tooling and for ease of access for the robot or end-of-arm tooling. The work object [10] preferably mounts onto a fixture [90] using a standard NAAMS hole pattern mount [40]. The mounts are laser cut to ensure the exact matching of hole sizes for the mounting of parts.

The robotic work object cell calibration method of the present invention uses a work object [10] having a zero point, a zero reference frame, and a zero theoretical frame in space, which is positioned on the fixture [90].

The work object [10] is placed onto the fixture [90] which visually represents the work object [10] enabling the tool contact point of the weld gun to be orientated into the work object [10] obtaining the "real-world" relationship of the robot tool [80] to the fixture [90] while updating the work object [10] to this "real-world" position.

The robotic work object cell calibration system of the present invention requires that the position of the work object

[10] correlate with the position of the robot tool [80] to calibrate the path of the robot tool [80] while acquiring the "real-world" distance and orientation of the fixture [90] relative to the robot tool [80].

The robotic work object cell calibration method positions the robot tool [80] with the work object [10] and determines the difference.

The robotic work object cell calibration method of the present invention is used to calibrate a "known" work object or frame (robotic simulation CAD software provided work object). The robotic work object cell calibration method of the present invention works by projecting laser beams to a known X, Y, and Z position and defining known geometric planes used to adjust the roll, yaw, and pitch of the robot tool [80] relative to the tool contact point [60].

The laser is projected onto the robotic end of the robot arm tooling (weld guns, material handlers, mig torches, etc) where the user will manipulate the robot with end-of-arm tooling into these lasers to obtain the positional difference between the "known" off-line program (simulation provided work object) and the actual (shop floor) work object calibration. The reverse is also true—for instance; a material handler robot can carry the work object [10] to a know work piece with known features.

The CAD model of the work object [10] is placed in the robotic simulation CAD world. The CAD user selects a position best suited on a tool or work piece to avoid crashes with other tooling and for ease of access for the robot or end-of-arm tooling. The off-line programs are then downloaded relative to this work object [10]. The work object [10] will be placed onto the tool or work piece in the position that was defined by the CAD user on the shop floor. The robot technician then manipulates the tool contact point [60] into the device, aligning it to the laser beams to obtain the difference between the CAD world and shop floor. This difference is then entered into the robot and used to define the new work object, thus calibrating the off-line programs and defining the distance and orientation of the tool, fixture, peripheral, and other key components.

The robotic work object cell calibration method of the present invention calibrates the paths to the robot [81] while involving the calibration of the peripherals of the robot.

The laser plane generating system deployed in the robotic work object cell calibration method of the present invention is well known in the art—see for example U.S. Pat. No. 5,689, 330 (Gerard, et al.), entitled "Laser Plane Generator Having Self-Calibrating Levelling System"; and U.S. Pat. No. 6,314, 650 (Falb), entitled "Laser System for Generating a Reference Plane".

The robotic work object cell calibration method of the present invention aids in the kiting or reverse engineering of robotic systems for future use in conjunction with robotic simulation software allowing integrators the ability to update their simulation CAD files to the "real world" positions.

The technology uses existing body-in-white procedures, personnel computers and software and ways of communicating information amongst the trades.

Throughout this application, various Patents and Applications are referenced by number and inventor. The disclosures of these documents are hereby incorporated by reference into this specification in their entireties in order to more fully describe the state of the art to which this invention pertains.

It is evident that many alternatives, modifications, and variations of the robotic work object cell calibration system of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

PARTS LIST 10. work object ($1^{st}$ preferred embodiment)
22. horizontal frame member
24. vertical frame member
25. E-shaped structure
26A and 26B. arms
32A. left frame end (horizontal)
32B. right frame end (horizontal)
32C. upper frame end (vertical)
32D. lower frame end (vertical)
40. NAAMS mounting
41. plane-emitting laser from left-side of horizontal frame
42. plane-emitting laser from right-side of horizontal frame
43. plane-emitting laser from upper vertical frame
44. plane-emitting laser from lower vertical frame
51. projected laser plane from plane-emitting laser (41)
52. projected laser plane from plane-emitting laser (42)
53. projected laser plane from plane-emitting laser (43)
54. projected laser plane from plane-emitting laser (44)
56. laser beam from arm (26A)
58. laser beam from center of "E"
60. tool contact point
80. robot tool
81. robot
82. robot joint
85A. & 85B. robot linkages
87. robot base
90. fixture
110. $2^{nd}$ work object
210. $3^{rd}$ work object
310. $4^{th}$ work object

I claim:

1. A method for calibrating a robot work path for a robot tool on an automotive shop floor by deployment of a calibration system, said calibration system including a work object mounted on a fixture, said work object including at least a first and second laser, said first laser emitting a first laser beam and said second laser emitting a second laser beam, said calibrating method comprising:
   a. placing said work object relative to a selected position on said fixture, said fixture being positioned on said automotive shop floor;
   b. projecting said first and said second laser beams from said work object on said automotive shop floor, said first and second laser beams intersecting at a laser intersection point;
   c. manipulating said robot tool into alignment with said laser intersection point from said work object, so as to enable calibration of said robot work path for said robot tool relative to said laser intersection point when said work object is mounted onto said fixture; and
   d. downloading an offline program relative to said work object, said work object being placed onto said robot tool in a position defined by CAD simulation software on said automotive shop floor;
   whereby said offline program defines position and orientation of said robot tool and fixture on said automotive shop floor.

2. The method of claim 1, wherein said work object includes two plane-projecting lasers.

3. The method of claim 1, wherein said work object includes four plane-projecting lasers.

4. The method of claim 1, wherein said work object is mounted onto said fixture using a NAAMS hole pattern mount.

5. A method for calibrating a robot work path for a robot tool on an automotive shop floor by deployment of a calibration system, said calibration system including a work object mounted on a fixture, said work object including at least a first and second laser, said first laser emitting a first laser beam and said second laser emitting a second laser beam, said first and second laser beams intersecting at a laser intersection point, said calibrating method comprising:
   a. placing said work object relative to a selected position on said fixture, said fixture being positioned on said automotive shop floor;
   b. projecting said first and said second laser beams from said work object on said automotive shop floor, said first and second laser beams intersecting at a laser intersection point;
   c. manipulating said robot tool into alignment with said laser intersection point from said work object on said automotive shop floor; and
   d. enabling calibration of said robot work path for said robot tool relative to said laser intersection point when said is mounted onto said fixture;
   e. downloading an offline program relative to said work object, said work object being placed onto said robot tool in a position defined by CAD simulation software on said automotive shop floor;
   whereby said offline program defines position and orientation of said robot tool and fixture on said automotive shop floor.

6. The method of claim 5, wherein said work object includes two plane-projecting lasers.

7. The method of claim 5, wherein said work object includes four plane-projecting lasers.

8. The method of claim 5, wherein said work object is mounted onto said fixture using a NAAMS hole pattern mount.

9. A method for calibrating a robot work path for a robot tool on an automotive shop floor by deployment of a calibration system, said calibration system including a work object mounted on a fixture, and said robot tool, said work object including at least a first and second laser, said first laser emitting a first laser beam and said second laser emitting a second laser beam, said first and second laser beams intersecting at a laser intersection point, said calibrating method comprising:
   a. placing said fixture relative to a selected position relative to said robot tool, said fixture being positioned on said automotive shop floor;
   b. projecting said first and said second laser beams from said work object on said automotive shop floor, said first and second laser beams intersecting at a laser intersection point;
   c. manipulating said robot tool into alignment with said laser intersection point for said fixture on said automotive shop floor, so as to enable calibration of said robot work path for said robot tool relative to said laser intersection point when said work object is mounted onto said fixture; and
   d. downloading an offline program relative to said work object, said work object being placed onto said robot tool in a position defined by CAD simulation software on said automotive shop floor;
   whereby said offline program defines position and orientation of said robot tool and fixture on said automotive shop floor.

10. The method of claim 9, wherein said work object includes two plane-projecting lasers.

11. The method of claim 9, wherein said work object includes four plane-projecting lasers.

12. The method of claim 9, wherein said work object is mounted onto said fixture using a NAAMS hole pattern mount.

* * * * *